United States Patent [19]

Piotti

[11] 4,290,002
[45] Sep. 15, 1981

[54] METHOD AND APPARATUS FOR CONTROLLING BATTERY RECHARGING

[75] Inventor: Peter B. Piotti, Westchester, Pa.

[73] Assignee: Gould Inc., Rolling Meadows, Ill.

[21] Appl. No.: 45,444

[22] Filed: Jun. 4, 1979

[51] Int. Cl.³ .............................................. H02J 7/04
[52] U.S. Cl. ...................................... 320/20; 320/21; 320/39
[58] Field of Search ....................... 320/20, 21, 22–24, 320/39, 40, 48

[56] References Cited

U.S. PATENT DOCUMENTS

| | | |
|---|---|---|
| 3,355,651 | 11/1967 | Olson . |
| 3,363,162 | 1/1968 | Bawden . |
| 3,531,706 | 9/1970 | Mullersman . |
| 3,590,358 | 6/1971 | Ruben . |
| 3,700,997 | 10/1972 | Smith . |
| 3,767,994 | 10/1973 | Dittmar et al. . |
| 3,794,905 | 2/1974 | Long . |
| 3,936,718 | 2/1976 | Melling et al. . |
| 3,938,019 | 2/1976 | Schmitt et al. . |
| 3,938,021 | 2/1976 | Kosmin . |
| 3,979,658 | 9/1976 | Foster . |
| 4,017,724 | 4/1977 | Finger .............................. 320/48 X |
| 4,052,656 | 10/1977 | Lavell . |
| 4,118,661 | 10/1978 | Siekierski et al. ............. 320/48 X |

Primary Examiner—Robert J. Hickey
Attorney, Agent, or Firm—Augustus J. Hipp

[57] ABSTRACT

A method of and apparatus (10) for controlling the charging of a battery (17) wherein determination of a preselected point in the battery charging operation is determined by a circuit portion (22) determining the duty cycle of digitized waveform information provided by a digitizing circuit portion (21). The digitizing circuit portion provides an output having opposite states depending on the voltage appearing across the battery (17) being charged and a reference voltage provided by the control apparatus (10). The apparatus includes a capacitor (61) having a voltage corresponding to the duty cycle of the digitized information. An output transducer (23) is controlled by the capacitor voltage and additional circuitry of the apparatus (10) including a detecting zener diode (17) so as to cause the transducer to provide an output signal when the effective voltage on the capacitor rises to the zener diode nominal voltage so as to provide current therethrough for effecting the desired control of the transducer (23). The control apparatus (10) includes structure for permitting facilitated calibration thereof when desired.

22 Claims, 5 Drawing Figures

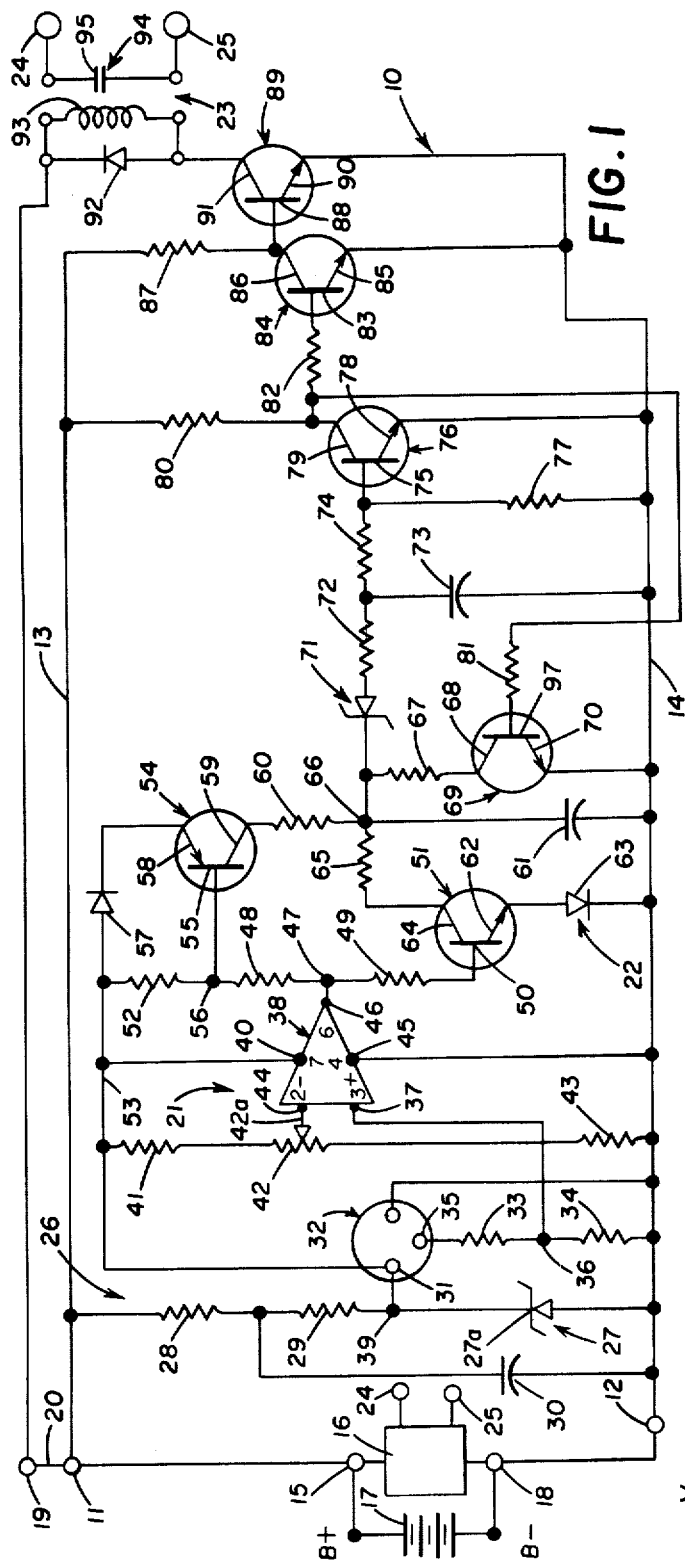
FIG. 1
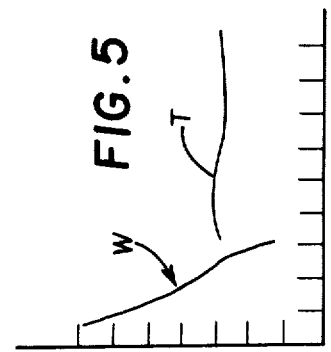
FIG. 5
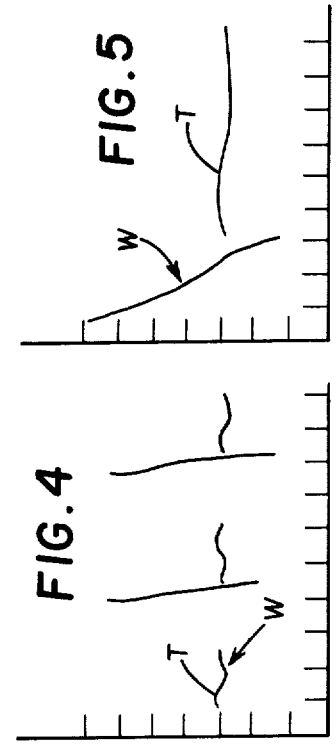
FIG. 4
FIG. 3
FIG. 2
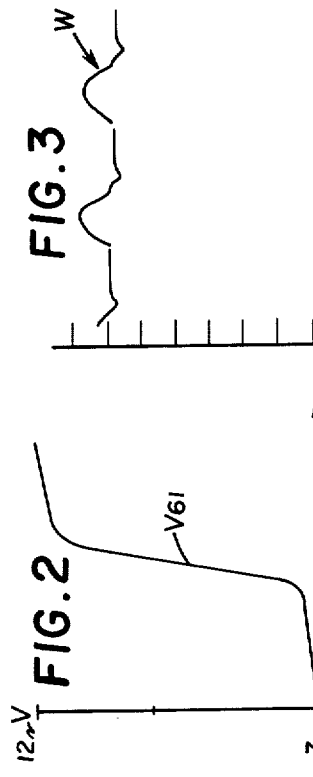

METHOD AND APPARATUS FOR CONTROLLING BATTERY RECHARGING

DESCRIPTION

1. Technical Field

This invention relates to recharging of rechargeable batteries, such as lead acid batteries, and in particular to means for controlling the recharging operation by determining the instantaneous state of charge of the battery while the recharging operation is being carried on.

2. Background Art

One conventional form of battery charger comprises a ferroresonant charger. A long felt need has arisen for determining the state of charge of the battery during the charging operation so as to permit effective automatic full recharging of the battery. A serious problem arises in attempting to determine the instantaneous state of charge during the charging operation as the battery's internal DC IR drop necessitates a correction of the measured battery terminal voltage during the charging operation. It has been found that ferroresonant chargers and the like do not provide a pure DC charging voltage, but provide a voltage having a ripple content. Further, it has been found that the ripple content may vary from charger to charger.

One attempted solution to this problem has been to utilize an averaging DC voltmeter. It has been found, however, that such a means for determining the state of charge during the charging operation is not fully satisfactory as a result of the variation in the charging waveform which is a function of the characteristics of both the battery and the particular charger. Thus, it has been found that the average voltage at a particular state of charge of the battery may vary in excess of 1% from charger to charger.

A number of different charging devices have been developed in the background art. Illustratively, Ellis W. Olson shows, in U.S. Pat. No. 3,355,651, a battery activator which includes apparatus for determining the condition of the battery by comparison of the output of the battery under load conditions with a predetermined standard. The apparatus more specifically includes a testing means for determining the potential of the battery a preselected period of time after the battery is connected to a load. Termination of the charging of the battery is effected when a comparison of this potential with a predetermined value indicates the desired charge condition of the battery.

In U.S. Pat. No. 3,936,718 of William Gordon Melling et al, a battery charging control circuit is provided for controlling the charging of a battery in which gassing may occur at some stage during the charging operation. The control circuit determines the onset of gassing by determining a unique point in the temporal pattern of the differences between successive registered battery voltages as measured during interruption of charging. The control then modifies the charging current to a level appropriate to charging of the battery while the battery is gassing.

Another battery charging circuit is illustrated in U.S. Pat. No. 3,938,021 of Melvyn S. Kosmin. In this circuit, the terminal voltage of the battery being charged is constantly monitored so that when the terminal voltage drops off at full charge, the circuit terminates the charging operation. This circuit relies on the terminal voltage characteristic of the conventional rechargeable battery in the area of full charge. As discussed in this patent, the terminal voltage rises briefly and then falls back at full charge. The circuit detects the inflection point at the peak of the brief current rise and automatically terminates the charging operation as a result of such detection. The circuit utilizes a diode delivering current to a charging capacitor. The circuit is arranged so as to permit current flow through the diode into the capacitor suitably to maintain a preselected voltage drop across the diode up to the inflection point of the battery charging waveform. At the inflection point, the voltage across the diode decreases and termination of the charging operation is automatically effected as a result of such decrease.

Maurice Lavall et al disclose a battery charging system in U.S. Pat. No. 4,052,656 wherein the battery parameters are continuously sensed so as to control the charging current. The system is arranged to provide an initial high charging current, a controlled charge tapering period, and a finishing current period so as to effect full recharging of the battery in minimum overall time without injuring the battery. The circuit utilizes means for tracking the terminal voltage of the battery for electronically estimating the amount of charge being delivered to the battery. The system includes a current smoothing negative feedback circuit. The circuit further includes means for determining the total charge delivered to the battery during the high initial current and tapered delivery portion of the charging operation so as to define a time period for effecting the finishing current charging operation.

DISCLOSURE OF INVENTION

The present invention comprehends an improved method and apparatus for controlling the charging of a rechargeable battery by constantly and instantaneously determining the state of charge thereof during the recharging operation. The method and apparatus are adapted for use with a charging apparatus, such as a ferroresonant charging apparatus, or the like, which provides cyclical periods of substantially zero current flow to the battery during the charging operation with the charging waveform during the zero current periods containing a small transient. It has been determined that this transient is present and defines a generally similar transient waveform from charger to charger varying primarily only in its amplitude characteristics from charger to charger. More specifically, it has been found that the peak-to-peak voltage of the transient may have a value in the range of 80 to 160 mv. depending on the charger. Thus, the transient represents a maximum peak-to-peak voltage of approximately 1% of the overall voltage it is desired to detect in controlling the operation of the recharging operation.

It has further been found that the transient is repetitive on a 60 Hz. base rather than a 120 Hz. base. Thus, as shown in FIGS. 3 and 4 of the present drawing, the first peak of successive zero current portions of the charging waveform are alternatively positive and negative. Prior art structures attempting to utilize multiplex measurement techniques in controlling the charging operation based on such zero current waveform characteristics have been complicated by this reversing peak condition.

As further shown in FIG. 5 of the drawing, a commutation notch occurs in the waveform at the beginning of the zero current phase. The amplitude of such commutation notches is approximately 300 mv.

The present invention comprehends a novel method of controlling the charging of the battery which eliminates problems caused by the presence of the commutation notch while utilizing the information carried in the transient portion of the waveform, as discussed above.

More specifically, the present invention comprehends an improved method and apparatus for controlling the charging of a battery by means of a ferroresonant charger or the like wherein a determination of the duty cycle content of the transient waveform is utilized to automatically control the charging operation.

In the illustrated embodiment, the information in the transient portion of the charging voltage waveform is digitized by suitable digitizing means. The duty cycle content of the digitized information is then determined and the desired control of the charging of the battery is then effected as a function of the determined duty cycle content.

It has been found that a substantial change in the duty cycle content occurs at a desired detection point, such as a detection point corresponding to the fully charged condition of the battery.

Thus, the invention permits the determination of the state of charge of the battery within a high degree of accuracy at the detection point by measuring the digitized duty cycle information within a much lower degree of accuracy, such as ±3½% of the detection point. In the illustrated embodiment, the detection point may be determined within ±4 mv. or less, which represents an accuracy of approximately 0.03% where the detection point is a fully charged battery voltage condition of 14 v. Thus, the accuracy of detection is substantially greater than the normal permissible accuracy of ±1%.

Thus, the invention comprehends the detection of the state of charge of the battery corresponding to the open circuit terminal voltage thereof with a high degree of accuracy by utilizing known characteristics of the battery charging system in a novel and simple manner. Broadly, the invention contemplates determining the state of charge of the battery by determining the duty cycle content of digitized information relative to the transient portion of the waveform occurring in the charging operation during the zero current cycle portions. The invention contemplates the improved method of effecting such a determination of the state of charge and new and improved apparatus for carrying out the method.

BRIEF DESCRIPTION OF THE DRAWING

FIG. 1 is a schematic wiring diagram showing a control circuit embodying the invention for controlling the charging of the battery by a ferroresonant charger or the like;

FIG. 2 is a graph illustrating the change in control voltage with time during the charging operation;

FIG. 3 is a graph illustrating the battery charging voltage waveform;

FIG. 4 is a graph illustrating said waveform to a larger scale so as to bring out the presence of the transient in the flat zero current portion of the waveform; and FIG. 5 is a graph thereof to a still larger scale.

BEST MODE FOR CARRYING OUT THE INVENTION

In the illustrative embodiment of the invention as disclosed in the drawing, an improved battery charging control apparatus generally designated 10 includes input terminals 11 and 12 connected to leads 13 and 14, respectively. Terminal 11 of control 10 may be connected to the terminal 15 of the battery charger 16 which is connected to the B+ terminal of the battery 17 being charged. Terminal 12 is connected to the terminal 18 of the charger 16 which is connected to the B− terminal of battery 17. As further shown, terminal 11 may be connected to a terminal 19 of apparatus 10 by means of a removable shorting link 20. Link 20 is normally connected between terminals 11 and 19 during the battery charging operation and is removed only for calibration of the apparatus, as will be brought out more fully hereinafter.

Control apparatus 10 includes a digitizing portion generally designated 21 and a duty cycle determining portion generally designated 22. Termination of the charging operation is effected by a transducer portion generally designated 23 of the apparatus 10 connected to suitable control terminals 24 and 25 of the charger.

Briefly, apparatus 10 functions to sense the battery charging waveform as appearing at terminals 15 and 18, to digitize the battery charging waveform, to determine the duty cycle characteristics of the digitized information and to utilize the duty cycle information to control the transducer 23.

More specifically, as shown in FIG. 1, the connection of leads 13 and 14 to battery charger terminals 15 and 18 provides a desired information signal as to the voltage waveform appearing at the battery terminals as well as providing to the apparatus 10 the necessary operating power therefor. As shown in FIG. 1, the control circuit includes a regulated 13 v. power supply portion generally designated 26 including a 13 v. zener diode 27 connected in series with a first resistor 28 and a second resistor 29 between leads 13 and 14. A capacitor 30 is connected in parallel with the series connection of resistor 29 and zener diode 27. The cathode 27a of the zener diode is connected to input terminal 31 of a voltage regulator 32 providing a nominal 10 v. DC output. A pair of resistors 33 and 34 are connected in series between one output terminal 35 of the voltage regulator 32 and lead 14, with the junction 36 therebetween being connected to input terminal 37 of a comparator 38. In the illustrated embodiment, resistors 33 and 34 are selected so as to provide a voltage corresponding to the desired detection point voltage which illustratively comprises 8.26 volts.

The reference voltage appearing at junction 39 between resistor 29 and cathode 27a of zener diode 27 is also delivered to an input 40 of the comparator 38. A scaled voltage corresponding to the battery voltage is further provided to comparator 38 by means of a series connection of resistor 41, variable potentiometer 42, and resistor 43 connected between leads 53 and 14, in turn connected to the battery terminals through charger terminals 15 and 18, as discussed above. The wiper 42a of the potentiometer is connected to the negative input 44 of the comparator 38. Resistors 41 and 43 and potentiometer 42 are selected so as to provide a nominal 8.25 voltage input to the comparator when the battery voltage is at the desired detection point. Comparator 38 is arranged so that the voltage appearing at terminal 44 is compared with the voltage appearing at terminal 40 which comprises the solid reference voltage obtained from the zener diode 27, as discussed above. As shown, comparator terminal 45 is connected to lead 14.

Output terminal 46 of the comparator is connected to a junction 47 between a series connection of a resistor 48 and a resistor 49. In the illustrated embodiment, the input to the comparator at terminal 37 from the reference regulator 32 drives the comparator output positive. The input to terminal 44, comprising a scaled input representing the battery voltage, drives the comparator negative, and in the present instance, towards zero. The output voltage appearing at terminal 46 comprises a square wave having a maximum amplitude of 13 v. and a duty cycle dependent on the indicated inputs to terminals 37 and 44.

Base 50 of a transistor 51 is connected to resistor 49. Resistor 48 is connected through a resistor 52 to lead 53 connected to reference junction 39. A second transistor 54 has its base 55 connected to a junction 56 between resistors 52 and 48. A diode 57 is connected between lead 53 and the emitter 58 of transistor 54. The collector 59 of the transistor is connected through a resistor 60 and a capacitor 61 to lead 14. The emitter 62 of transistor 51 is connected through a diode 63 to lead 14 and the collector 64 of the transistor 51 is connected through a resistor 65 to the junction 66 between resistor 60 and capacitor 61.

When the output at comparator terminal 46 is 0 volts, the transistor switch 51 is biased to the "off" state and the transistor switch 54 is biased to the "on" state. Under this condition, the transistor 54 permits current to flow through the resistor 60 into capacitor 61. Concurrently, current may flow from junction 66 through a resistor 67 to the collector 68 of a transistor 69, having its emitter 70 connected to lead 14. Transistor 69, at this time, is in the "on" state and, thus, current may flow through resistor 67 and transistor 69 in parallel with the current flow to capacitor 61. Resultingly, the voltage appearing across capacitor 61 increases.

In the circuit arrangement of FIG. 1, the comparator output may not reach 0 volts, but must reach within one diode drop of 0 volts. Thus, diode 63 is provided to assure that when the comparator is in the low, approximately 0-volt state, there will not be sufficient voltage available to transistor 51 to switch the transistor to the "on" state. In the illustrated circuit, resistor 49 provides a leakage path for current between the collector 64 and base 50 of the transistor 51.

When the comparator output rises to its maximum value, transistor switch 54 is biased to the "off" state and transistor switch 51 is biased to the "on" state through the resistor 49 and diode 63. This permits current to now flow from the capacitor 61 to reference through resistor 65, transistor 51 and diode 63. At the same time, current may flow from the capacitor 61 through the parallel path defined by resistor 67 and transistor 69, which is biased to the "on" state at this time.

Such flow of current from the capacitor reduces the voltage thereon. Again, comparator 38 may not reach the positive reference value, but is guaranteed to be within one diode drop of the positive reference value as a result of provision of diode 57 in the emitter circuit of transistor switch 54. Thus, when comparator 38 is in its high state, there will be insufficient voltage present to bias the transistor 54 to the "on" state. Resistor 52 provides a path back to the positive side of the circuit for any leakage which occur between the base 55 and collector 59 of transistor 54.

As a result of the scaling of the inputs to comparator 38, the output is in one state when the battery charging waveform is above the set DC voltage and is in the opposite state when the battery charging waveform goes below that voltage. In the apparatus 10, this voltage corresponds to the DC average of the voltage transient which occurs during the zero current portion of the battery charging waveform, as discussed briefly above. Thus, more specifically, with reference to FIGS. 3, 4 and 5, the set DC voltage corresponds to the DC average of the transient T, which has been found to be present during the zero current condition of the battery charging waveform W as provided by the battery charger 16 where the charger comprises a ferroresonant charger and the like. As a result, the comparator effectively digitizes the information content of the battery charging voltage waveform. This digital information resultingly has a varying duty cycle depending on the state of charge of the battery.

Capacitor 61, which is alternately charged and discharged depending on the signal appearing at comparator output terminal 46, is resultingly caused to have an effective voltage which varies directly with the duty cycle of the digitized information provided by the comparator 38.

Referring now to FIG. 2, it may be seen that the voltage on capacitor 61 increases very slowly until a desired detection point is approached. The voltage then increases rapidly both in respect to voltage and time. Because of this rapid change, or relatively large slope to the voltage curve, as seen in FIG. 2, detecting the voltage across capacitor 61 with a modest degree of accuracy corresponds to detecting a preselected point in the battery charging voltage waveform with relatively high accuracy. Such detection is effected by means of a zener diode 71, which may have an accuracy of approximately 2%, and which is connected from junction 66 through a resistor 72 and a capacitor 73 to lead 14. Resistor 72, in turn, is connected to a resistor 74 to the base 75 of a switching transistor 76. Base 75 is connected through a resistor 77 to lead 14. Emitter 78 of the transistor 76 is connected to lead 14 and collector 79 is connected through a resistor 80 to the lead 13.

Thus, when the voltage on capacitor 61 reaches a preselected voltage corresponding to the selected voltage of zener diode 71, which illustratively may be 8.2 v. nominal, current flows from the capacitor through the diode 71 and resistors 72 and 74 to the transistor 76 and concurrently into capacitor 73. Resistors 72 and 74 serve as means for limiting the current and capacitor 73 serves as means for smoothing the ripple of the current. Resistor 77 serves as a path for leakage which may occur between collector 79 and base 75 of transistor 76 to assure that the transistor switch is in the "off" state whenever zener diode 71 prevents delivery of current to base 75.

When the current flow through diode 71 reaches a preselected lower limit, transistor switch 76 is turned to the "on" state. Resultingly current may not flow through resistor 80 and through a resistor 81 connected between the base 97 of transistor 69 and the collector 79 of transistor 76, thereby permitting transistor 69 to revert to its "off" state.

The collector 79 of transistor 76 is further connected through a resistor 82 to the base 83 of a transistor switch 84 having its emitter 85 connected to lead 14 and its collector 86 connected through a resistor 87 to lead 13. Collector 86, in turn, is connected to the base 88 of a transistor switch 89 having its emitter 90 connected to lead 14 and its collector 91 connected through a diode 92 to terminal 19.

Transistor 84 is concurrently switched to its "off" state by the diversion of current through resistor 80 through transistor 76 when this transistor is switched to its "on" state. This switching of the transistors causes an abrupt rise in the voltage on capacitor 61 by a small amount as a result of the switching of the transistor 69 to its "off" state so as to prevent flow of current from the capacitor to lead 14 through the transistor 69. Resultingly, the small increase in voltage on capacitor 61 causes a further increase in the current flow through the zener diode 71, thereby to further increase the base current of the transistor 76 and provide a hysteresis effect positive feedback locking the transistor 76 in its "on" state.

As indicated above, transistor 84 is switched to its "off" state concurrently with the switching of transistor 69 to its "off" state. The current flow through resistor 87 is now permitted to become the base current of the transistor switch 89, which was previously in its "off" state. This current flow switches the transistor 89 to a hard "on" condition, thereby permitting current flow through the coil 93 of an electromagnetic relay generally designated 94. Energization of the coil 93 effects a changing of the state of the contact switch 95 connected to terminals 24 and 25 of the battery charger 16 so as to terminate further charging of the battery 17. In the illustrated embodiment, the contact switch 95 is normally opened.

Diode 92 provides a short-circuiting path across the coil 93 so as to prevent generation of a high voltage spike which could otherwise damage transistor 89 when the transistor 89 returns to its "off" state.

When it is desired to calibrate the apparatus 10, the connecting link 20 is removed from between terminals 11 and 19 and a first power supply connected between terminal 19 and a terminal 12 with a second power supply being connected between terminals 11 and 12. The use of two such power supplies has been found desirable because of the relatively large current requirements of the relay coil 93 which may cause a given regulated power supply to drop several millivolts. As the apparatus 10 is sensitive to such millivolt variation, as discussed above, this could cause the relay 94 to drop out and thus cause an undesirable oscillatory condition. It has been found that in the normal charging operations, as discussed above, the battery 17 provides a stiff enough voltage source so that the battery may be used for powering the relay as well as for maintaining a constant voltage supply to the sensing circuitry.

Referring again to FIG. 2, it has been found that with the apparatus 10 as discussed above having a zener diode 71 providing an overall accuracy of ±5% in the selected capacitor detectant voltage of nominally 8.2 volts, accuracy in detecting the battery charging voltage waveform to within ±4 mv. is obtained. Thus, by utilizing the duty cycle information content of the digitized battery charging voltage waveform, a highly accurate control of the charging operation is effected without the necessity for removing the battery from the charging operation and thereby substantially facilitating control of the recharging of such batteries.

As will be obvious to those skilled in the art, the transducer 23 may comprise any suitable transducer as well as the illustrated electromagnetic relay 94. Similarly, the control apparatus 10 may be adjusted to provide control at any preselected point in the battery charging operation.

As will also be obvious to those skilled in the art, the circuit may alternatively be arranged so as to provide a decreasing voltage as a function of the duty cycle within the scope of the invention. This could be accomplished for example by connecting the comparator 38 lead 44 to resistor junction 36 and connecting comparator 38 lead 37 to lead 42a of potentiometer 42 and then substituting a normally closed contact switch in place of the normally open contact switch 95.

Industrial Applicability

The battery charging control apparatus 10 of the present invention may be utilized in effecting automatic charging of a wide range of rechargeable batteries. The control apparatus may be utilized with commercially available ferroresonant battery charging devices as well as other such charging devices providing a transient voltage in the zero current phase of the charging cycle similar to that of the ferroresonant chargers as discussed above.

The control apparatus 10 provides highly accurate control of the battery charging operation while yet utilizing relatively low accuracy components as discussed above. Thus, the invention comprehends a substantial improvement in the battery charging art in permitting highly desirable high accuracy in controlling the charging operation while yet effecting the same with apparatus which is extremely simple and economical of construction.

The invention comprehends both the improved method of utilizing the duty cycle information of the digitized transient waveform as well as the disclosed apparatus for effecting such improved charging control.

Other aspects, objects and advantages of this invention can be obtained from a study of the drawings, the disclosure and the appended claims. The foregoing disclosure of specific embodiments is illustrative of the broad inventive concepts comprehended by the invention.

I claim:

1. A method of controlling the charging of a rechargeable battery (17) during the charging thereof by a ferroresonant charging apparatus (16) and the like which provides cyclical periods of substantially zero current flow to the battery during the charging operation, said method comprising the steps of:
   digitizing information representative of a portion of the charging voltage waveform (W) during said period of zero current flow; and
   determining the duty cycle content of the digitized information as an indication of the state of charge of the battery.

2. The method of controlling the charging of a battery of claim 1 including the further step of causing termination of the charging of the battery (17) when the determined duty cycle content reaches a preselected value corresponding to the charged condition of the battery.

3. The method of controlling the charging of a battery of claim 1 wherein said step of determining the duty cycle content is caused to be accurate to within approximately $3\frac{1}{2}\%$.

4. The method of controlling the charging of a battery of claim 1 wherein said step of digitizing said information comprises a step of comparing a scaled value of the battery charging waveform (W) with a scaled value of a solid reference voltage and providing an output signal having selectively opposite states as a function of whether said charging waveform is greater or less than the reference voltage scaled value.

5. The method of controlling the charging of a battery of claim 1 wherein said step of determining the duty cycle comprises a step of alternately charging and discharging a capacitor (61) and determining the effective voltage across the capacitor (61).

6. The method of controlling the charging of a battery of claim 1 wherein said step of determining the duty cycle comprises a step of alternately charging and discharging a capacitor (61) suitably to change the voltage across the capacitor (61) as a direct function of the duty cycle and determining the effective voltage across the capacitor (61).

7. The method of controlling the charging of a battery of claim 1 wherein said step of determining the duty cycle comprises a step of alternately charging and discharging a capacitor (61) suitably to slowly change the voltage across the capacitor (61) with respect to time while the state of charge of the battery (17) is below a preselected state of charge and to rapidly increase the voltage across the capacitor (61) with respect to time as the state of charge reaches said preselected state of charge and determining the effective voltage across the capacitor (61).

8. The method of controlling the charging of a battery of claim 1 wherein said step of determining the duty cycle comprises a step of alternately charging and discharging a capacitor (61) suitably to slowly change the voltage across the capacitor (61) with respect to average battery charging voltage while the state of charge of the battery (17) is below a preselected state of charge and to rapidly change the voltage across the capacitor (61) with respect to average battery charging voltage as the state of charge reaches said preselected state of charge and determining the effective voltage across the capacitor (61).

9. The method of controlling the charging of a battery of claim 1 wherein said step of determining the duty cycle comprises a step of alternately charging and discharging a capacitor (61) suitably to slowly change the voltage across the capacitor (61) with respect to time and the average battery charging voltage while the state of charge of the battery (17) is below a preselected state of charge and to rapidly change the voltage across the capacitor (61) with respect to time and the average battery charging voltage as the state of charge reaches said peselected state of charge and determining the effective voltage across the capacitor (61).

10. The method of controlling the charging of a battery of claim 1 wherein said step of determining the duty cycle comprises a step of alternately charging and discharging a capacitor (61) and determining the effective voltage across the capacitor (61), and including the further step of causing termination of the charging of the battery (17) when the determined effective voltage across the capacitor (61) reaches a preselected voltage.

11. The method of controlling the charging of a battery of claim 1 wherein said step of determining the duty cycle comprises a step of alternately charging and discharging a capacitor (61), smoothing ripple of the voltage across the capacitor (61) caused by said alternately charging and discharging, and determining the effective smoothed voltage across the capacitor (61).

12. The method of controlling the charging of a battery of claim 1 wherein said step of determining the duty cycle comprises a step of alternately charging and discharging a capacitor (61) and determining the effective voltage across the capacitor (61), and including the step of introducing hysteresis in the determining of the effective voltage across the capacitor (61) to smooth ripple in said effective voltage.

13. The method of controlling the charging of a battery of claim 1 wherein said step of determining the duty cycle comprises a step of alternately charging and discharging a capacitor (61) and determining the effective voltage across the capacitor (61) within an accuracy of ±5% to provide an accuracy in the state of charge determination of ±4 mv.

14. Control apparatus (10) for controlling the charging of a rechargeable battery (17), such as a lead acid battery, by means of a ferroresonant battery charger (16) and the like providing alternating periods of current delivery to the battery and periods of substantially no current delivery to the battery and during which a transient voltage (T) having a peak-to-peak voltage in the order of 1% of the fully charged battery voltage appears in the charging voltage waveform (W), said control apparatus comprising:

digitizing means (21) for digitizing information representative of said transient voltage;

determining means (22) for determining the duty cycle content of the digitized information; and control means (23) responsive to said determining means for controlling charging of the battery by said battery charger.

15. The control apparatus of claim 14 wherein said preselected duty cycle corresponds to the charged condition of the battery (17).

16. The control apparatus of claim 14 wherein said digitizing means (21) comprises means for digitizing said information with said transient voltage having a peak-to-peak voltage in the range of approximately 80 to 160 mv.

17. The control apparatus of claim 14 wherein said determining means (22) comprises means for determining said duty cycle content within an accuracy of ±3½%.

18. The control apparatus of claim 14 wherein said digitizing means (21) comprises means (41,42, 43) for providing a scaled value of the battery charging waveform (W) during said periods of no current delivery, means (32) for providing a scaled value of a solid reference voltage, and means (38) for comparing said values and providing an output signal to said determining means (22).

19. The control apparatus of claim 14 wherein said determining means (22) comprises a capacitor (61) and means (51,63,69) for causing the effective voltage of the capacitor to correspond to the duty cycle content of the information received from the digitizing means (21).

20. The control apparatus of claim 14 wherein said digitizing means (21) comprises means (41,42,43) providing a scaled value of the battery charging waveform (W) during said periods of no current delivery, means (32) for providing a scaled value of a solid reference voltage, and means (38) for comparing said values and providing an output signal to said determining means (22), said output signal having selectively opposite states as a function of whether said charging waveform scaled value is greater or less than the reference voltage scaled value, said determining means (22) comprising a capacitor (61) and means (51,63,69) responsive to said output signal for cyclically charging and discharging said capacitor (61) to provide an effective voltage thereon corresponding to the duty cycle content of said signal.

21. The control apparatus of claim 14 wherein said determining means (22) comprises a capacitor (61) and means (51,63,69) for causing the effective voltage of the capacitor (61) to correspond to the duty cycle content of the information received from the digitizing means (21), and means (73) for smoothing ripple of the capacitor voltage.

22. The control apparatus of claim 14 wherein said control means (23) comprises means for terminating said charging of the battery (17) as an incident of said determining means (22) determining a duty cycle content of said digitized information corresponding to the charged condition of the battery.

* * * * *